(12) United States Patent
Atherton et al.

(10) Patent No.: US 10,708,479 B2
(45) Date of Patent: *Jul. 7, 2020

(54) OPTICAL MEASUREMENT OF OBJECT LOCATION IN THREE DIMENSIONS

(71) Applicant: AUTODESK, INC., San Rafael, CA (US)

(72) Inventors: Evan Atherton, San Carlos, CA (US); David Thomasson, San Francisco, CA (US); Heather Kerrick, San Rafael, CA (US); Maurice Conti, Muir Beach, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,548

(22) Filed: Jul. 16, 2019

(65) Prior Publication Data

US 2019/0337161 A1 Nov. 7, 2019

Related U.S. Application Data

(63) Continuation of application No. 15/363,956, filed on Nov. 29, 2016, now Pat. No. 10,363,667.

(60) Provisional application No. 62/261,049, filed on Nov. 30, 2015.

(51) Int. Cl.
*B25J 13/08* (2006.01)
*H04N 5/225* (2006.01)
*B25J 11/00* (2006.01)

(52) U.S. Cl.
CPC ............ *H04N 5/2256* (2013.01); *B25J 11/00* (2013.01); *B25J 13/088* (2013.01)

(58) Field of Classification Search
CPC ........ B25J 13/088; B25J 9/1697; B25J 11/00; H04N 5/2256
See application file for complete search history.

(56) References Cited

U.S. PATENT DOCUMENTS

| 4,942,539 A * | 7/1990 | McGee ................. B25J 9/1697 348/42 |
| 7,864,173 B2 | 1/2011 | Handley et al. |
| 9,914,214 B1 | 3/2018 | Strauss et al. |
| 2007/0280508 A1 * | 12/2007 | Ernst ................. G06K 9/00624 382/107 |
| 2008/0218743 A1 | 9/2008 | Stetten et al. |

(Continued)

*Primary Examiner* — Yon J Couso
(74) *Attorney, Agent, or Firm* — Artegis Law Group, LLP

(57) ABSTRACT

One embodiment of the present invention sets forth a technique for determining a location of an object that is being manipulated or processed by a robot. The technique includes capturing a digital image of the object while the object is disposed by the robot within an imaging space, wherein the digital image includes a direct view of the object and a reflected view of the object, detecting a visible feature of the object in the direct view and the visible feature of the object in the reflected view, and computing a first location of the visible feature in a first direction based on a position of the visible feature in the direct view. The technique further includes computing a second location of the visible feature in a second direction based on a position of the visible feature in the reflected view and causing the robot to move the object to a processing station based at least in part on the first location and the second location.

20 Claims, 8 Drawing Sheets

(56) References Cited

U.S. PATENT DOCUMENTS

| | | | |
|---|---|---|---|
| 2013/0044190 A1* | 2/2013 | Hu | G06T 7/80 348/50 |
| 2013/0107032 A1* | 5/2013 | Yamada | B25J 11/00 348/86 |
| 2014/0018957 A1* | 1/2014 | Matsumoto | B25J 9/1697 700/251 |
| 2015/0302590 A1* | 10/2015 | Hong | H04N 13/296 348/46 |
| 2017/0173798 A1* | 6/2017 | Watanabe | B25J 9/1697 |

* cited by examiner

OPTICAL MEASUREMENT OF OBJECT LOCATION IN THREE DIMENSIONS

CROSS-REFERENCE TO RELATED APPLICATIONS

This application is a continuation of United States patent application titled, "OPTICAL MEASUREMENT OF OBJECT LOCATION IN THREE DIMENSIONS," filed on Nov. 29, 2016 and having Ser. No. 15/363,956, which claims the benefit of U.S. provisional patent application titled, "TECHNIQUE FOR TOOL CALIBRATION AND END EFFECTOR DESIGN," filed on Nov. 30, 2015 and having Ser. No. 62/261,049. The subject matter of these related applications is hereby incorporated herein by reference.

BACKGROUND OF THE INVENTION

Field of the Invention

The present invention relates generally to computer-aided manufacturing and, more specifically, to optical measurement of object location in three dimensions.

Description of the Related Art

When analyzing interactions between a workpiece and a part of a robot configured to manipulate or process the workpiece, such as a robotic arm, it is oftentimes useful to determine the locations of the tips, edges, or other extremities of the object. Quantifying such locations based on precise measurements of the workpiece can aid the robotic arm in manipulating and otherwise processing the workpiece. For example, based on the location of the workpiece relative to the robot, the robot can relocate, translate, rotate, and otherwise orient the workpiece in such a way as to avoid interferences between the workpiece and known obstructions proximate the robot. In addition, precise knowledge of the location of a workpiece being manipulated or processed by the robot increases the safety of workers or other bystanders in the vicinity of the robot.

Conventional approaches for locating an object being manipulated by a robot, such as a workpiece being held and processed by the robot, often require multiple time-consuming measurements to be performed using expensive equipment. For example, in calibrating the location of a workpiece associated with a robot, a computer numerical control (CNC devices), or other technically-feasible computer-aided device, locations are measured via touch-based measurements. Such touch-based measurements require expensive, highly-engineered and instrumented machinery and generally require multiple distinct measurements to be performed for each point or feature to be located on the workpiece. For example, to determine the location of one point or feature on the workpiece, the workpiece may be physically touched multiple times to a first sensor to determine a location with respect to a first dimension, multiple times to a second sensor to determine a location with respect to a second dimension, and multiple times to a third sensor to determine a location with respect to a third dimension. Each such measurement procedure is time-consuming, and is typically performed multiple times on a single workpiece.

Other conventional approaches exist for measuring the dimensions or location of an object in multiple dimensions simultaneously. However, such approaches generally involve complex machinery, where the object is required to remain stationary for a particular time interval while the multiple measurements are being made. For example, a camera may be revolved around the workpiece or multiple stationary cameras may capture images of the workpiece from multiple viewpoints. Such approaches often involve complex technologies that require time-consuming and complex set-up, calibration, and troubleshooting, such as laser-based scanning.

As the foregoing illustrates, what is needed in the art are more effective techniques for measuring the location of a workpiece being manipulated or processed by a robot.

SUMMARY

One embodiment of the present invention sets forth a technique for determining a location of an object that is being manipulated or processed by a robot. The technique includes capturing a digital image of the object while the object is disposed by the robot within an imaging space, wherein the digital image includes a direct view of the object and a reflected view of the object, detecting a visible feature of the object in the direct view and the visible feature of the object in the reflected view, and computing a first location of the visible feature in a first direction based on a position of the visible feature in the direct view. The technique further includes computing a second location of the visible feature in a second direction based on a position of the visible feature in the reflected view and causing the robot to move the object to a processing station based at least in part on the first location and the second location.

At least one advantage of the disclosed techniques is that the location of a workpiece or object can be quickly and precisely determined in fractions of a second. Further, the apparatus employed to implement these techniques is low-cost and quite simple, in both set-up and operation.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the embodiments of the present invention. However, it will be apparent to one of skill in the art that the embodiments of the present invention may be practiced without one or more of these specific details.

Figure 1:
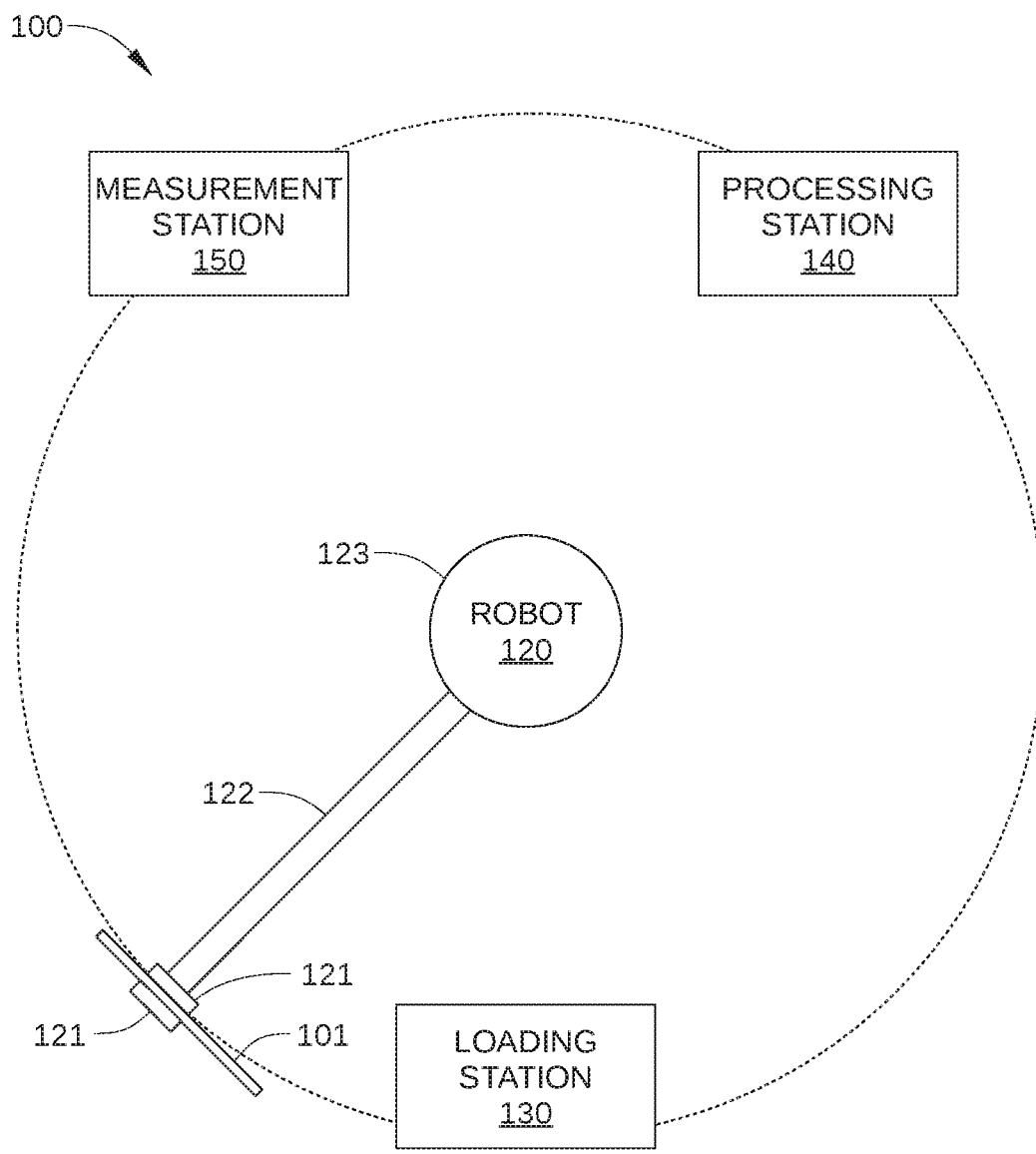
FIG. 1 is a block diagram of a robotic processing system configured to implement one or more aspects of the present invention.

FIG. 1 is a block diagram of a robotic processing system 100 configured to implement one or more aspects of the present invention. Robotic processing system 100 is a robotic system that is configured to facilitate robot-based operations that rely upon calibration of the position of a workpiece held by a robot. For example, in some embodiments, robotic processing system 100 is a robotic system that is configured to process a workpiece with a combination of robot-based and human-based operations, such as human-assisted loading of a workpiece onto a robot. In such embodiments, the inherently imprecise placement of the workpiece by a human operator may necessitate calibration of the position of the workpiece, so that the robot can safely and accurately process the workpiece. Alternatively or additionally, in some embodiments, robotic processing system 100 is a robotic system that is configured to process workpieces that inherently include significant irregularities in one or more dimensions, such as wood or bamboo workpieces. Consequently, in such embodiments, calibration of the position of the workpiece may be necessitated for optimal processing and for safe and effective interactions with human workers while performing programmed tasks. In the embodiment illustrated in FIG. 1, robotic processing system 100 includes a robot 120, a loading station 130, a processing station 140, and a measurement station 150.

Robot 120 may be any technically feasible autonomous or semi-autonomous robot, CNC device, or other computer-aided apparatus configured to move, orient, manipulate, and/or process a workpiece 101 in an automated or semi-automated fashion. In some embodiments, robot 120 includes an end effector 121 on an end of an arm 122. End effector 121 is configured to hold or otherwise mechanically couple workpiece 101 to arm 122 as shown, and may include a clamp or gripper assembly. Arm 122 may include one or more articulated joints or swivels, and is configured to transport workpiece 101 between loading station 130, processing station 140 and measurement station 150, as required, for the processing of workpiece 101. In the embodiment illustrated in FIG. 1, robot 120 positions end effector 121 and workpiece 101 at one or more stations of robotic processing system 100 via rotation of a hub 123. Alternatively or additionally, in some embodiments, robot 120 may be configured to transport workpiece 101 from one station of robotic processing system 100 to another station via linear translation, or via a combination of linear translation and rotation.

Robot 120 may further include an internal computing device (not shown) or other controller for controlling operation of end effector 121, arm 122, and/or hub 123. The internal computing device may be any technically feasible hardware unit capable of processing data and/or executing software applications to facilitate operation of robot 120, as described herein. In addition, the internal computing device of robot 120 may receive location information for workpiece 101 from measurement station 150.

Loading station 130 is an area of robotic processing system 100 configured to facilitate the loading of workpiece 101 onto end effector 121 of robot 120. In some embodiments, loading station 130 may be as simple as a clearly defined area for human interaction with robot 120. In other embodiments, loading station 130 may include jigs or other apparatus for assisting the human-based loading and unloading of end effector 121 and/or sensors for detecting the presence of arm 122 or end effector 121. Alternatively or additionally, loading station 130 may include one or more input devices for human input of instructions for robot 120 and/or other interactions with robot 120, such as start or stop switches.

Processing station 140 is an area of robotic processing system 100 configured for the processing of workpieces, either by robot 120, one or more processing apparatus included in processing station 140, or a combination of both. In some embodiments, robot 120 may be configured to precisely position and/or manipulate workpiece 101 at processing station 140, so that an additional processing apparatus disposed at processing station 140 (not shown), can process workpiece 101 in a predefined, repeatable fashion. For example, an additional processing apparatus disposed at processing station 140 may include a machining tool, welding device, paint sprayer, and the like. Alternatively, robot 120 may be configured to load workpiece 101 onto the additional processing apparatus for processing. In either case, proper positioning and/or processing of workpiece 101 at processing station 140 is facilitated by precise knowledge of the dimensions of workpiece 101 and/or the location of workpiece 101 with respect to end effector 121. That is, precise knowledge of a coordinate offset between an extremity or extremities of workpiece 101 and end effector 121 is highly beneficial to robot-based processing of workpiece 101.

Measurement station 150 is an area of robotic processing system 100 configured for calibration of the position of workpiece 101 with respect to end effector 121 or any other part of robot 120. Thus, measurement station 150 is configured for determining the location of one or more visible features of workpiece 101, such as an end point, an edge, a corner, etc. Thus, by transporting workpiece 101 to measurement station 150 via robot 120, robotic processing system 100 can calibrate or otherwise measure the position of workpiece 101 with respect to end effector 121, thereby facilitating properly executed processing of workpiece 101 at processing station 140.

According to various embodiments of the present invention, measurement station 150 is configured to perform measurements, in multiple dimensions, of a portion of workpiece 101 disposed in an imaging space of measurement station 150. In addition, measurement station 150 is configured to perform such measurements in a single operation that can be accurately performed in a fraction of a second. Further, the location of multiple visible features of workpiece 101 can be performed in the same operation. One such embodiment of measurement station 150 is described below in conjunction with FIG. 2.

Controller 160 is configured to implement various embodiments of the invention. Thus, in some embodiments, the functionality of controller 160 may be implemented as an analog logic circuit and/or a digital logic circuit. Alternatively or additionally, the functionality of controller 160 may be implemented as a central processing unit (CPU), a digital signal processor (DSP), an application-specific integrated circuit (ASIC), a field-programmable gate array (FPGA), any other type of processing unit, or a combination of different processing units.

Figure 2:
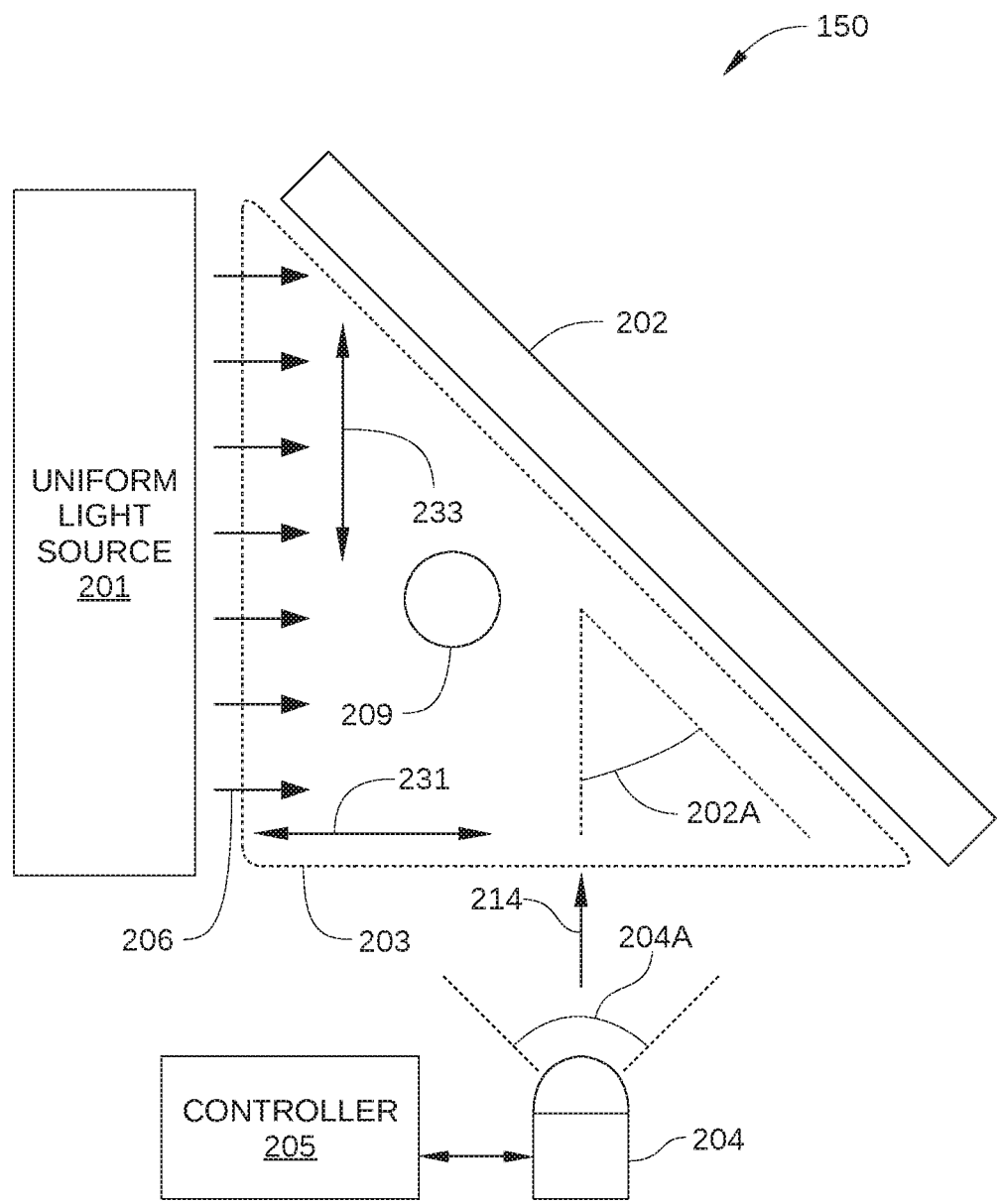
FIG. 2 is a plan view of the measurement station of FIG. 1, according to various embodiments of the present invention.

FIG. 2 is a plan view of measurement station 150, according to various embodiments of the present invention. As shown, measurement station 150 generally includes a uniform light source 201 and a mirror 202, each disposed adjacent to an imaging space 203. Measurement station 150 further includes an image capturing device 204 and a controller 205.

Uniform light source 201 is configured to direct light 206 toward imaging space 203 to illuminate an object 209 disposed in imaging space 203, such as a workpiece coupled to arm 122 by end effector 121. Thus, when robot 120 moves workpiece 101 to measurement station 120 for calibration of the position of workpiece 101, uniform light source 201 illuminates workpiece 101 in a substantially uniform and repeatable manner. In addition, uniform light source 201 is configured to provide a uniform, white background in images of object 209 captured by image capturing device 204. In some embodiments, uniform light source 201 is configured as a light box in which a light diffuser is disposed between the individual light sources disposed within the light box and imaging space 203.

Mirror 202 includes a reflective surface disposed on a different side of imaging space 203 than uniform light source 201 is disposed. In addition, mirror 202 is oriented at a mirror angle 202A. Mirror 202 is positioned relative to imaging space 203 and oriented at mirror angle 202A so that a reflected view of object 209 (described below in conjunction with FIG. 5) is within a field of view 204A of image capturing device 204. In some embodiments, mirror angle 202A is selected with respect to the position of image capturing device 204 and field of view 204A. Specifically, in such embodiments, mirror angle 202A may be selected with respect to a central line-of-sight 214 of image capturing device 204 so that object 209 and a reflected view of object 209 are both within field of view 204A.

Measuring space 203 is a volumetric region disposed between uniform light source 201, mirror 202, and image-capturing device 204, and is configured to accommodate the positioning of object 209 therein for calibration of the location of object 209 with respect to robot arm 120. Thus, measuring space 203 is the volumetric region disposed adjacent to the triangular area denoted in FIG. 2, and spans a horizontal dimension 231, a vertical dimension (out of page in FIG. 2), and a depth dimension 233.

Image capturing device 204 may be any technically feasible digital image capture device suitable for use in measurement station 150. Thus, image capturing device 204 may be a digital camera, a digital video camera, and the like, that is configured with sufficient image resolution to facilitate digital image capture of object 209. In some embodiments, image capturing device 204 is configured to capture a digital image of imaging space 203 that enables subsequent edge detection and feature recognition processes to be performed on the digital image, as described below. Thus, in some embodiments, image capturing device 204 is directed toward a central region of imaging space 203 along central line-of-sight 214, so that field of view 204A encompasses most or all of imaging space 203.

Controller 205 is configured to implement various embodiments of the invention. Thus, controller 205 may be any technically feasible hardware unit capable of processing data and/or executing software applications, such as an object location application, to facilitate operation of measurement station 150, as described herein. In some embodiments, the functionality of controller 205 may be implemented as an analog logic circuit and/or a digital logic circuit. Alternatively or additionally, the functionality of controller 205 may be implemented as a central processing unit (CPU), a digital signal processor (DSP), an application-specific integrated circuit (ASIC), a field-programmable gate array (FPGA), any other type of processing unit, or a combination of different processing units. One embodiment of controller 205 described below in conjunction with FIG. 3.

Figure 3:
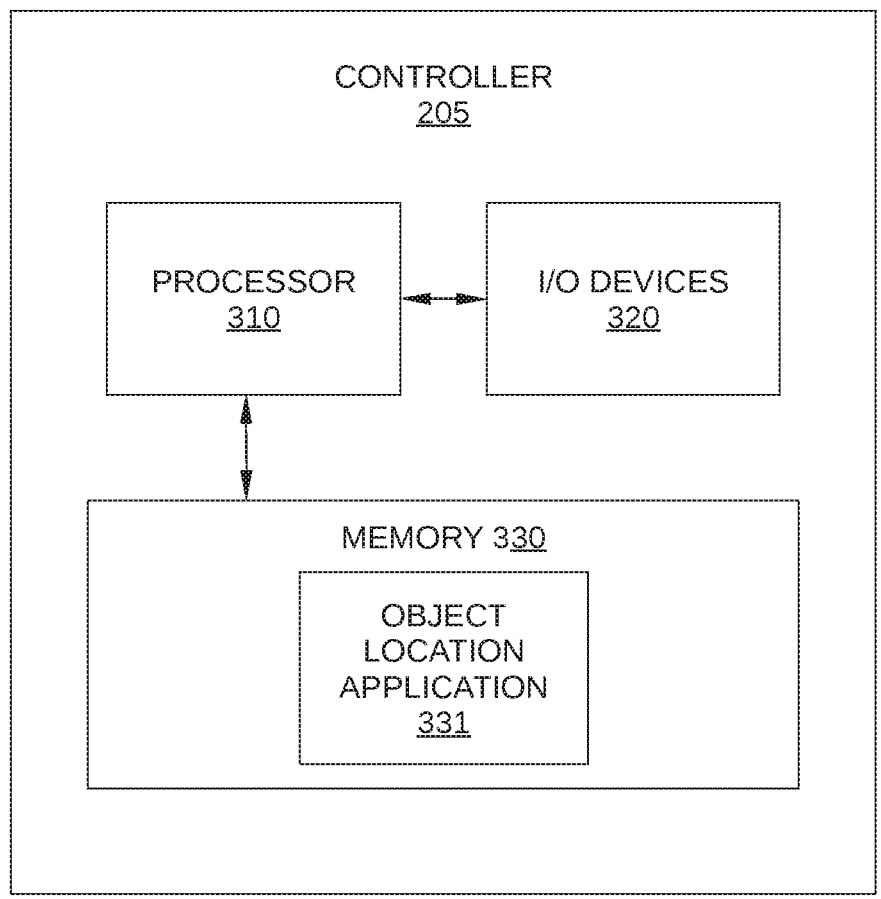
FIG. 3 illustrates a computing device configured to implement the controller of the measurement station of FIG. 2, according to various embodiments of the present invention.

FIG. 3 illustrates controller 205, according to various embodiments of the present invention. Controller 205 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Controller 205 is configured to run an object location application 331 that resides in a memory 3130. It is noted that the computing device described herein is illustrative and that any other technically feasible configurations fall within the scope of the present invention.

As shown, controller 205 includes, without limitation, an interconnect (bus) 340 that connects a processing unit 350, an input/output (I/O) device interface 360 coupled to input/output (I/O) devices 380, memory 330, a storage 330, and a network interface 370. Processing unit 350 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 350 may be any technically feasible hardware unit capable of processing data and/or executing software applications, such as object location application 331. Further, in the context of this disclosure, the computing elements shown in controller 205 may correspond to a physical computing system (e.g., a system in a data center) or may be a virtual computing instance executing within a computing cloud.

I/O devices 380 may include devices capable of providing input, such as a keyboard, a mouse, a touch-sensitive screen, and so forth, as well as devices capable of providing output, such as a display device. The display device may be a computer monitor, a video display screen, a display apparatus incorporated into a hand held device, or any other technically feasible display screen configured to present dynamic or animated media to an end-user. Additionally, I/O devices 380 may include devices capable of both receiving input and providing output, such as a touchscreen, a universal serial bus (USB) port, and so forth. I/O devices 380 may be configured to receive various types of input from an end-user of controller 205, and to also provide various types of output to the end-user of controller 205, such as displayed digital images or digital videos. In some embodiments, one or more of I/O devices 380 are configured to couple controller 205 to a network 305.

305 may be any technically feasible type of communications network that allows data to be exchanged between controller 205 and external entities or devices, such as a web server or another networked computing device. For example, network 305 may include a wide area network (WAN), a local area network (LAN), a wireless (WiFi) network, and/or the Internet, among others.

Memory 330 may include a random access memory (RAM) module, a flash memory unit, or any other type of memory unit or combination thereof. Processing unit 350, I/O device interface 360, and network interface 370 are configured to read data from and write data to memory 330. Memory 330 includes various software programs that can be executed by processor 350 and application data associated with said software programs, including object location application 331.

When measurement station 150 is in operation, object 209 is positioned within imaging space 203 by robot 120, image capturing device 204 captures a digital image of object 209 that includes a direct view and reflected view of object 209, and controller 205 determines a location of a visible feature of object 209. The determination of the location of the visible feature is based on the captured digital image of object 209. Specifically, the determination of the location of the visible feature is based on the direct view and the reflected view of object 209 in the digital image. One embodiment of a digital image that includes a direct view and a reflected view of object 209 is illustrated in FIG. 4.

Figure 4:
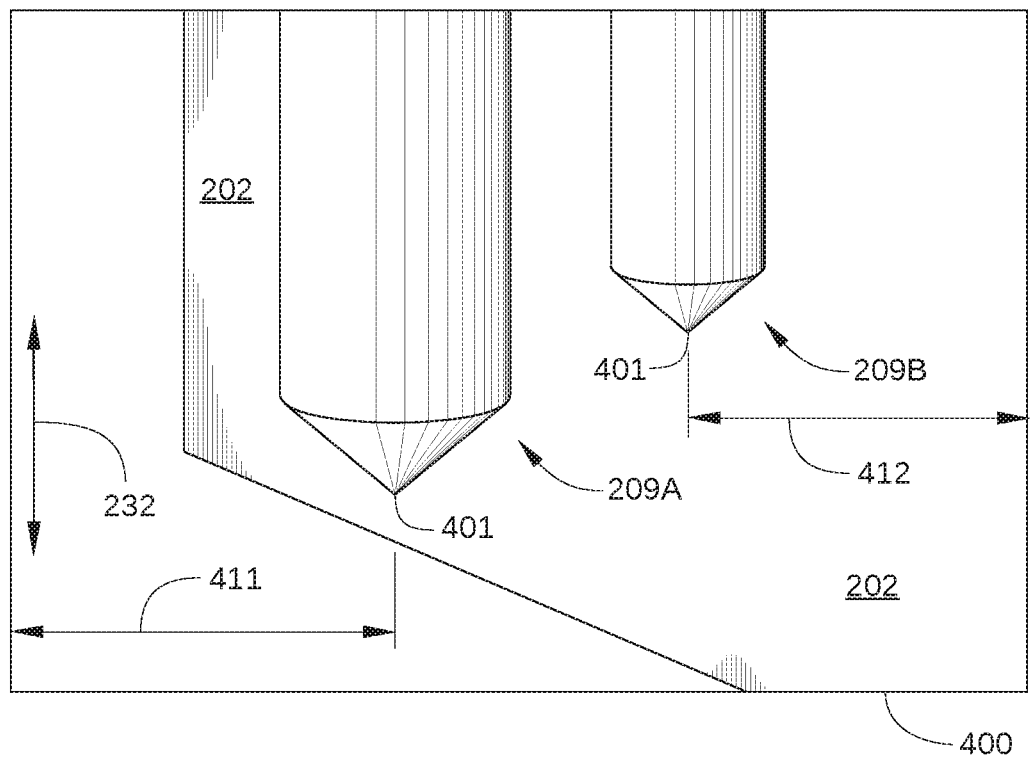
FIG. 4 is an example of a digital image captured by the image capturing device of FIG. 2, according to various embodiments of the present invention.

FIG. 4 is an example of a digital image 400 captured by image capturing device 204, according to various embodiments of the present invention. Digital image 400 is a digital image captured when object 209 is positioned within imaging space 203 by robot 120. Thus, digital image 400 includes a direct view 209A of object 209 and a reflected view 209B of object 209. Direct view 209A a view of object 209 as seen directly from image capturing device 204, with no intervening reflections. By contrast, reflected view 209B is a view of at least a portion of object 209 that is not directly visible to image capturing device 204. Instead, reflected view 209B is a view of object 209 as reflected from mirror 202.

Controller 205 determines a location of a visible feature of object 209, such as a bottom tip 401, based on a position of bottom tip 401 in direct view 209A and on a position of bottom tip 401 in reflected view 209B. More specifically, controller 205 determines the location of bottom tip 401 (or other visible features) in multiple dimensions, such as in the vertical direction (i.e., vertical dimension 232), the horizontal direction (i.e., horizontal dimension 231, shown in FIG. 2), and in depth (i.e., depth dimension 233, shown in FIG. 2). For example, in some embodiments, controller 205 determines the location of bottom tip 401 in horizontal dimension 231 based on a horizontal position 411 of bottom tip 401 in direct view 209A. Given a known location and orientation of image-capturing device 204 with respect to imaging space 203, there is a known correlation between each horizontal position 411 of object 209 in direct view 209A and an actual location in horizontal dimension 231 of imaging space 203. Similarly, in such embodiments, controller 205 determines the location of bottom tip 401 in depth dimension 233 based on a horizontal position 412 of bottom tip 401 in reflected view 209B. Similar to horizontal position 411 in direct view 209A, there is a known correlation between each horizontal position 412 of object 209 in reflected view 209B and an actual location in depth dimension 233 of imaging space 203. Thus, with a single digital image 400, the location of bottom tip 401 in horizontal dimension 231 of imaging space 203 and the location of bottom tip 401 in depth dimension 233 of imaging space 203 can both be determined simultaneously.

Furthermore, there is a known correlation between each vertical position in direct view 209A and an actual location in vertical dimension 232 of imaging space 203. Consequently, in some embodiments, controller 205 can also determine the location of bottom tip 401 in a third dimension (i.e., vertical dimension 232). Controller 205 determines the location of bottom tip 401 in vertical dimension 232 based on a vertical position of bottom tip 401 in direct view 209A. As a result, controller 205 can determine the location of bottom tip 401 (or any other visible feature of object 209) simultaneously with determining the location of bottom tip 401 in horizontal dimension 231 and in depth dimension 233. Because controller 205 makes the above determinations algorithmically, the location of bottom tip 401 in all three dimensions can be determined simultaneously and in a fraction of a second, thereby avoiding the unwanted delay associated with performing multiple repeated touch-off processes for each dimension of interest.

In some embodiments, controller 205 algorithmically computes the location of a particular visible feature of object 209 based on Equations 1-22 set forth below, although any other suitable algorithm may be employed without exceeding the scope of the invention. In such embodiments, X and Y positions of object 209 or a feature thereof are calculated with respect to an imaging space origin (shown in FIG. 5) via Equations 1-14; Z positions of object 209 (or the feature thereof) is calculated with respect to an X-Y plane on which image capturing device 204 is disposed via Equations 15-20; and a transform to a base frame to provide offset from an expected zero position via Equations 21-22. The variables included in Equations 1-22 are graphically defined in FIG. 5.

$$\alpha = \text{radians}(-180 + \text{MirrorAngle}) \quad (1)$$

$$\text{AngleCamToStick} = (\text{FrameSize}X/2 - \text{Front} \cdot x)/(\text{FrameSize}X/2) * (fovX/2.0) \quad (2)$$

$$\text{AngleCamToReflection} = (\text{FrameSize}X/2 - \text{side} \cdot x)/(\text{FrameSize}X/2) * (fovX/2.0) \quad (3)$$

$$cmy = -((\text{MirrorPosn} \cdot x - \text{CameraPosn} \cdot x) * \tan(\alpha)) - \text{CameraPosn} \cdot y \quad (4)$$

$$mcy = cmy * \cos(\alpha) \quad (5)$$

$$mcrx = mcy * \tan(\pi/2 - \text{radians}(-\text{CameraAngle}) + \text{AngleCamToReflection} - (\pi + \alpha) \quad (6)$$

$$\beta = \pi/2 - a\tan(mcy/mcrx) \quad (7)$$

$$\text{CamToReflectionDist} = \text{sqrt}(sq(mcy) + sq(mcrx)) \quad (8)$$

$$\gamma = \pi - (2*\beta) - (\text{AngleCamToStick} - \text{AngleCamToReflection}) \quad (9)$$

$$\text{CamToStickDist} = (\text{CamToReflectionDist}/\sin(\gamma)) * \sin(2*\beta) \quad (10)$$

$$\text{CamToStick}X = \text{CamToStickDist} * \cos(\text{AngleCamToStick} + \text{radians}(\text{CameraAngle})) \quad (11)$$

$$\text{CamToStick}Y = \text{CamToStickDist} * -\sin(\text{AngleCamToStick} + \text{radians}(\text{CameraAngle})) \quad (12)$$

$$\text{StickPos}X = \text{CamToStick}X + \text{CameraPosn} \cdot x \quad (13)$$

$$\text{StickPos}Y = \text{CameraPosn} \cdot y - \text{CamToStick}Y \quad (14)$$

where CameraPos=posn of focal point of camera in relation to corner of lightbox (mm); CameraAngle=angle of camera in relation to edge of lightbox (degrees); MirrorAngle=angle between lightbox and mirror (degrees); FrameSizeX=width of camera view (pixels); FrameSizeX=height of camera view (pixels); front=pixel position (x,y) of point of interest in front image; side=pixel position (x,y) of point of interest in mirror (side) image; fovX=field of view of camera horizontally (degrees); fovY=field of view of camera vertically (degrees); BaseFrameT=linear translation from origin to ideal object position; and BaseFrameR=rotation of uniform light source 201 in relation to robot base frame.

$$\text{AngleCamToObj}Y=(\text{FrameSize}Y/2-\text{front}\cdot y)/(\text{FrameSize}Y/2)*(fovY/2.0) \quad (15)$$

$$\text{ObjPosZFront}=\text{CameraPosn}\cdot z+(\text{CamToObjDist}*\tan(\text{AngleCamToObj}Y)) \quad (16)$$

$$\text{AngleCamToReflection}Y=(\text{FrameSize}Y/2-\text{side}\cdot y)/(\text{FrameSize}Y/2)*(fovY/2.0) \quad (17)$$

$$\text{ObjToReflectionDist}=\text{camToReflectionDist}/\sin(\gamma)*\sin(\text{AngleCamToObj}-\text{AngleCamToReflection}) \quad (18)$$

$$\text{ObjPosZside}=\text{CameraPosn}\cdot z+((\text{CamToReflectionDist}+\text{ObjToReflectionDist})*\tan(\text{AngleCamToObj}Y)) \quad (19)$$

$$\text{ObjPosZ}=\text{ObjPosZFront} \quad (20)$$

$$\text{ObjPos}=\text{new } P\text{Vector}(\text{ObjPos}X,\text{ObjPos}Y,\text{ObjPos}Z) \quad (21)$$

$$\text{result}=\text{transform}(\text{ObjPos},\text{BaseFrame}T,\text{BaseFrame}R) \quad (22)$$

Figure 5:
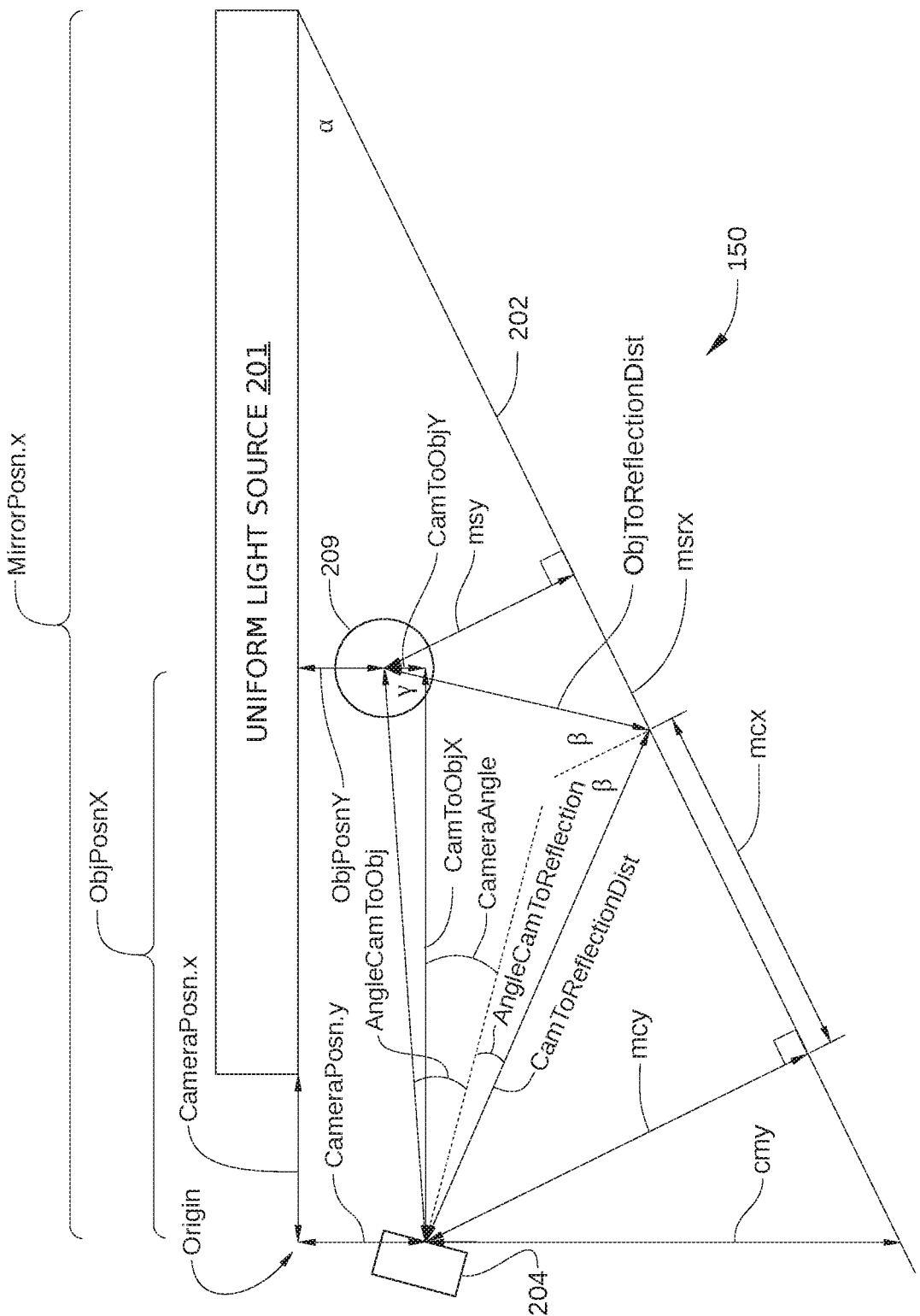
FIG. 5 schematically illustrates the measurement station of the robot processing system of FIG. 1 and graphically defines variables included in Equations 1-22, according to various embodiments of the invention.

FIG. 5 schematically illustrates measurement station 150 and graphically defines variables included in Equations 1-22, according to various embodiments of the invention.

Figure 6:
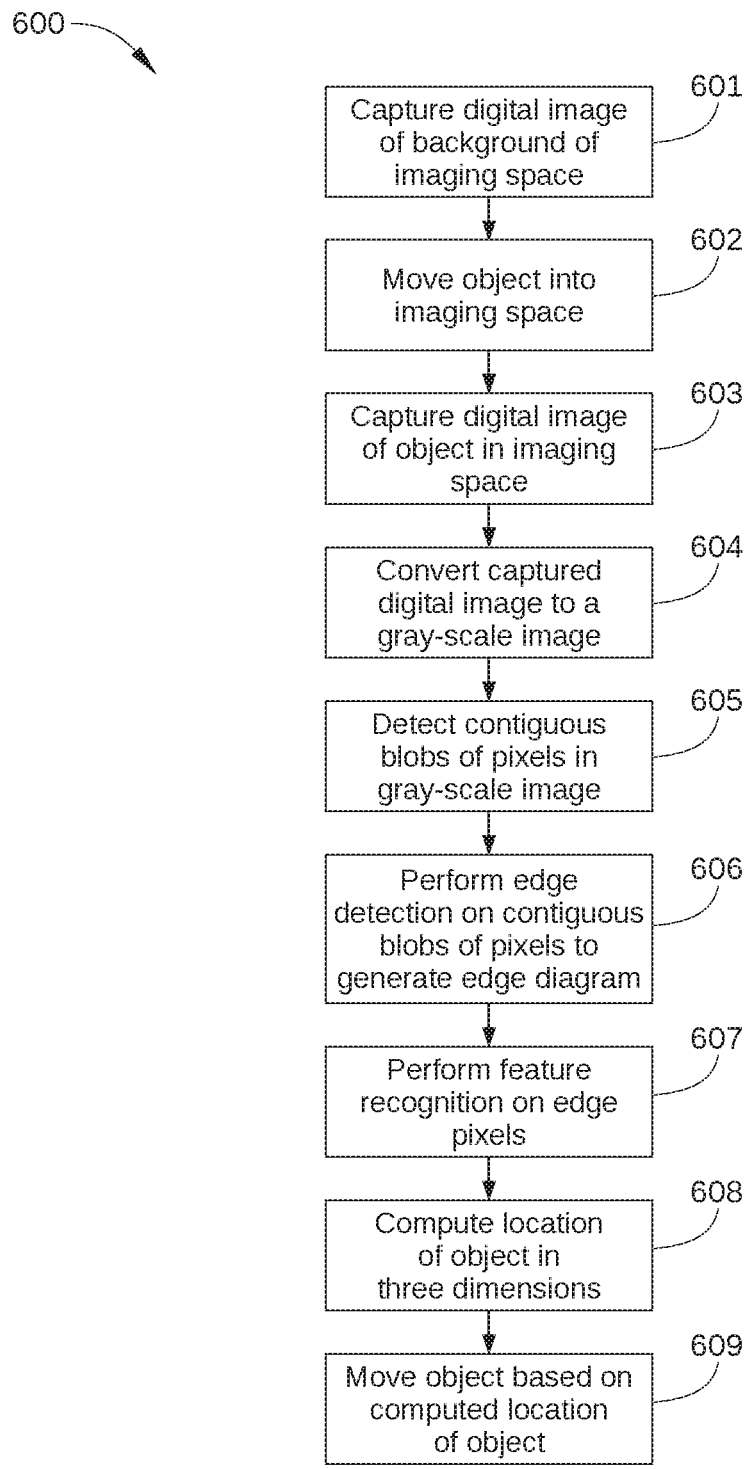
FIG. 6 is a flowchart of method steps for determining a location of an object being manipulated or processed by a robot, according to one embodiment of the present invention.

FIG. 6 is a flowchart of method steps for determining a location of an object being manipulated by a robot, according to one embodiment of the present invention. Although the method steps are described in conjunction with the systems of FIGS. 1-4, persons skilled in the art will understand that any system configured to perform the method steps, in any order, is within the scope of the present invention. In some embodiments, prior to the method steps, a robot positions an object, such as workpiece 101 or object 209 in imaging space 203.

As shown, a method 600 begins at step 601, where image-capturing device 204 captures a digital image of a background of imaging space 203, i.e., an image of imaging space 203 without object 209.

In step 602, robot 120 moves object 209, such as workpiece 101, into imaging space 203.

In step 603, image-capturing device 204 captures a digital image of object 209 in imaging space 203, such as digital image 400 in FIG. 4.

In step 604, controller 205 converts digital image 400 to a gray-scale image, to facilitate subsequent conversion of digital image 400 to a high-contrast image. Any technically feasible image conversion algorithm may be employed in step 604 to convert digital image 400 to the gray-scale image. In some embodiments, the digital image of the background in imaging space 203, captured in step 601, is subtracted from digital image 400 as part of converting digital image 400 to the gray-scale image.

Figure 7:
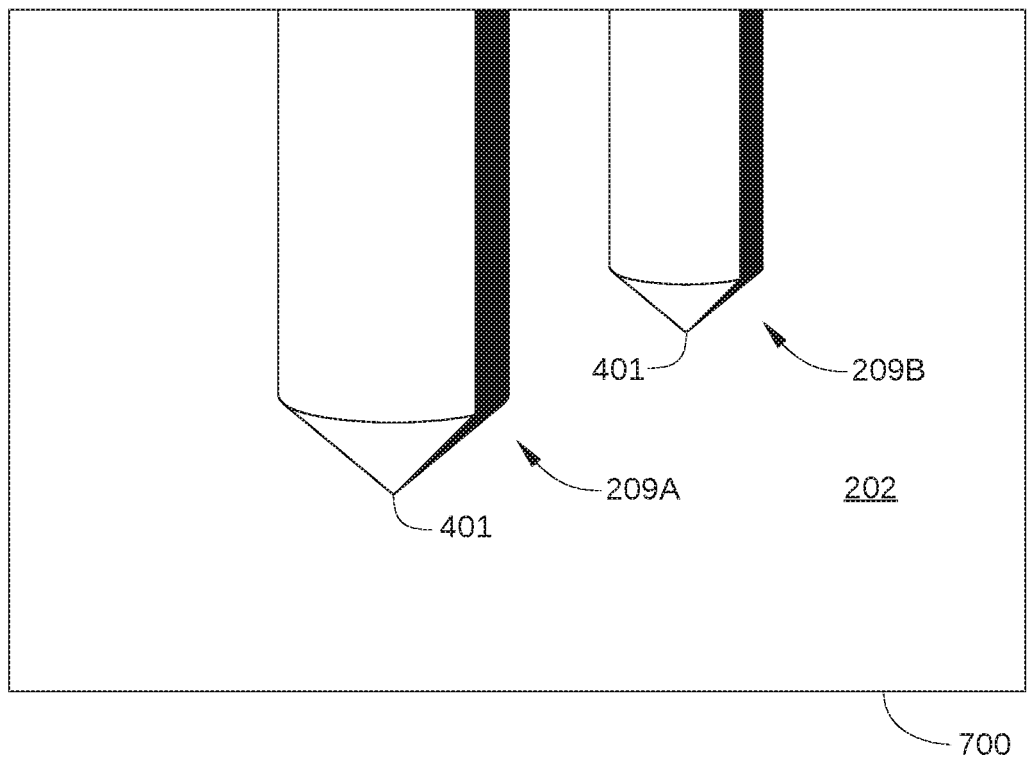
FIG. 7 is an example of a high-contrast image based on the digital image of FIG. 4, according to various embodiments of the present invention.

In step 605, controller 205 detects contiguous blobs of pixels included in digital image 400. For example, in some embodiments, controller 205 edits the gray-scale image using thresholding, masking, and/or blurring to facilitate blob detection. In such embodiments, the gray-scale image generated in step 604 is converted to a high-contrast image, as illustrated in FIG. 7. FIG. 7 illustrates a high-contrast image 700 that is generated from the gray-scale image generated in step 604. As shown, most features and all partial shading of direct view 209A and reflected view 209B have been eliminated, thereby facilitating subsequent edge detection processes to be performed on high-contrast image 700. It is noted that, because uniform light source 201 provides a relatively uniform background for digital image 400, contrast between direct view 209A/reflected view 209B and the surrounding portions of digital image 400 corresponding to mirror 202 is greatly enhanced.

Figure 8:
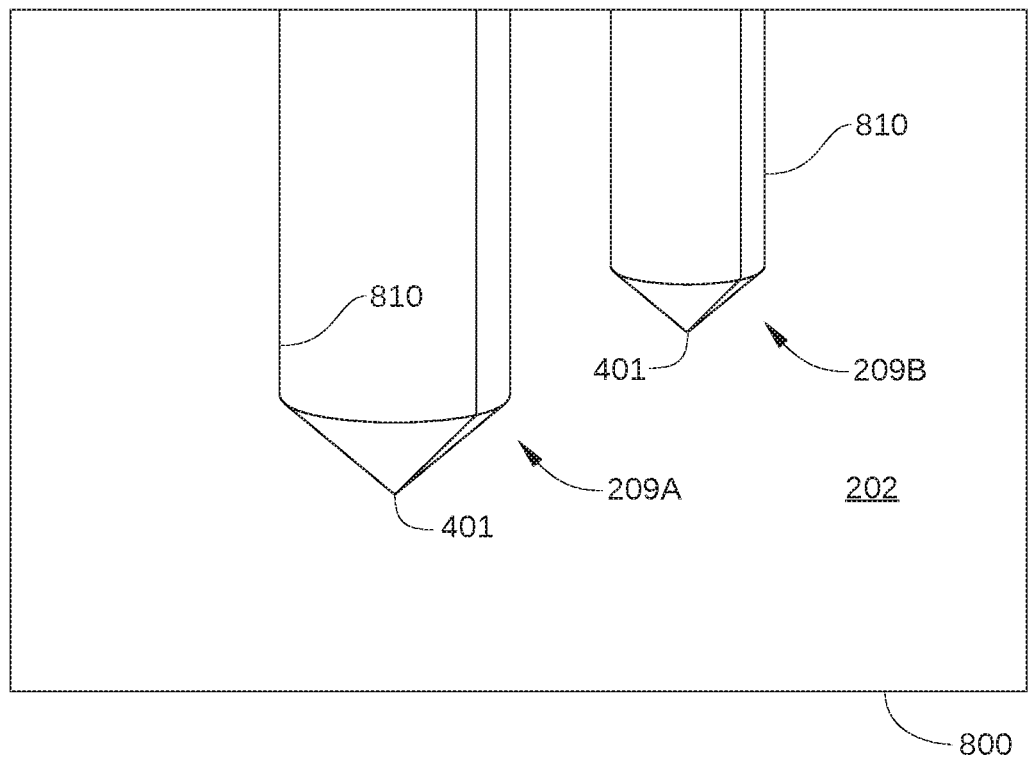
FIG. 8 is an example of an edge diagram that is generated from the high-contrast image of FIG. 7, according to various embodiments of the present invention.

In step 606, controller 205 performs edge detection on the contiguous blobs of pixels detected in step 605, such as high-contrast image 700, to generate an edge diagram of digital image 400, as illustrated in FIG. 8. FIG. 8 illustrates an edge diagram 800 that is generated from high-contrast image 700 generated in step 605. As shown, edge diagram 800 includes edges 810 that have been detected in high-contrast image 700 via a conventional edge detection algorithm. Any suitable edge detection algorithm may be employed in step 606. For example, in some embodiments, Canny edge detection is employed to isolate edges in high-contrast image 700. In some embodiments, prior to performing edge detection, a blurring algorithm may be applied to high-contrast image 700 or to the gray-scale image generated in step 604, so that the most prominent edges in high-contrast image 700 are included in edge diagram 800, while less prominent edges are not.

In step 607, controller 205 performs feature recognition on edge pixels, such as diagram 800. Any suitable computer vision feature recognition algorithm may be employed in step 607 to detect one or more features. For example, based on edges 810 detected in edge diagram 800, controller 205 can determine one or more visible features of object 209, such as edges, points, or other extremities. Such visible features of object 209 generally correspond to outer edges of object 209, the lowest point of object 209, etc. In this way, features defining the outer bounds of object 209 can be identified, and robot 120 can be notified of the precise shape or outer boundaries of object 209.

In step 608, controller 205 computes a location of one or more visible features of object 209 in one, two, or three dimensions, thereby determining the location of object 209 with respect to image-capturing device 204 and robot 120. As described above in conjunction with FIGS. 4 and 5, controller 205 generally determines such locations based on information in digital image 400, including direct view 209A of object 209 and reflected view 209B of object 209. Furthermore, controller 205 determines such locations without object 209 touching any other object disposed in imaging space 203 or at measuring station 150, such as a touch-off sensor.

In step 609, robot 120 moves object 209 (i.e., workpiece 101) to processing station 140 of robotic processing system 100, based on the location or locations of the one or more visible features of object 209 computed in step 608. Alternatively or additionally, robot 120 moves object 209 to any other station or location within robotic processing system 100 based on the location or locations of the one or more visible features of object 209 computed in step 608.

It is noted that because controller 205 determines the location of a particular feature of object 209 algorithmically based on a single digital image, controller 205 can readily determine the location of a plurality of such features quickly and simultaneously. Thus, the outer boundaries of a workpiece or other object, based on a plurality of visible features of the workpiece or object, can be determined quickly and precisely.

In sum, embodiments of the present invention provide techniques for locating an object in multiple dimensions with a single optical measurement. In the embodiments, a measurement apparatus captures a digital image of an object that includes a direct view of the object and a reflected view of the object. Based on positions of a visible feature or features of the object in the direct view and in the reflected view, a precise location of each such visible feature can be determined in three dimensions.

At least one advantage of the disclosed techniques is that the location of a workpiece or object can be quickly and precisely be determined in fractions of a second. Further, the apparatus employed to implement these techniques is low-cost and reasonably simplistic, both in set-up and operation.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of I/O devices that may acquire data associated with an object of interest, persons skilled in the art will appreciate that the systems and techniques described herein are applicable to other types of I/O devices. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
capturing a digital image of an object while the object is disposed by a robot within an imaging space;
detecting a visible feature of the object in a direct view of the object within the digital image;
detecting the visible feature in a reflected view of the object within the digital image;
computing a first location of the visible feature based on a position of the visible feature in the direct view;
computing a second location of the visible feature based on a position of the visible feature in the reflected view; and
causing the robot to move the object within an environment based on at least the first location and the second location.

2. The method of claim 1, wherein the first location of the visible feature is in a first direction, and the second location of the visible feature is in a second direction, and further comprising computing a third location of the visible feature in a third direction based on the position of the visible feature in the direct view.

3. The method of claim 2, wherein the third direction is orthogonal to the first direction and the second direction.

4. The method of claim 2, wherein the first direction and the third direction are in a viewing plane of a digital camera that captures the digital image.

5. The method of claim 1, wherein the first location is determined relative to an actuator of the robot.

6. The method of claim 1, further comprising causing the robot to position the object in the imaging space.

7. The method of claim 1, wherein the object does not touch any other object disposed in the imaging space.

8. The method of claim 1, wherein detecting the visible feature in both the direct view and the reflected view comprises performing a feature recognition process on an edge diagram derived from the digital image of the object.

9. The method of claim 8, further comprising generating the edge diagram based on a gray-scale image of the digital image of the object.

10. A system for determining a location of an object being manipulated or processed by a robot, the system comprising:
 a mirror adjacent to an imaging space;
 a digital camera configured to capture a digital image of the object when the object is disposed by the robot within the imaging space and a reflective surface of the mirror;
 one or more memories storing an object location application; and
 one or more processors that are coupled to the one or more memories and, when executing the object location application, are configured to:
  cause the digital camera to capture the digital image of the object;
  detect a visible feature of the object in a direct view of the object within the digital image;
  detect the visible feature in a reflected view of the object within the digital image;
  compute a first location of the visible feature based on a position of the visible feature in the direct view;
  compute a second location of the visible feature based on a position of the visible feature in the reflected view; and
  cause the robot to move the object within an environment based on at least the first location and the second location.

11. The system of claim 10, wherein the reflected view comprises a view of the object reflected from the mirror.

12. The system of claim 10, further comprising a light box that uniformly illuminates the imaging space.

13. The system of claim 10, wherein the first location is determined relative to an actuator of the robot.

14. One or more non-transitory computer readable media storing instructions that, when executed by one or more processors, cause the one or more processors to perform the steps of:
 capturing a digital image of an object while the object is disposed by a robot within an imaging space;
 detecting a visible feature of the object in a direct view of the object within the digital image;
 detecting the visible feature in a reflected view of the object within the digital image;
 computing a first location of the visible feature based on a position of the visible feature in the direct view;
 computing a second location of the visible feature based on a position of the visible feature in the reflected view; and
 causing the robot to move the object within an environment based on at least the first location and the second location.

15. The one or more non-transitory computer readable media of claim 14, wherein the first location of the visible feature is in a first direction, and the second location of the visible feature is in a second direction, and further comprising computing a third location of the visible feature in a third direction based on the position of the visible feature in the direct view.

16. The one or more non-transitory computer readable media of claim 15, wherein the third direction is orthogonal to the first direction and the second direction.

17. The one or more non-transitory computer readable media of claim 15, wherein the first direction and the third direction are in a viewing plane of the digital camera that captures the digital image.

18. The one or more non-transitory computer readable media of claim 14, wherein the first location is determined relative to an actuator of the robot.

19. The one or more non-transitory computer readable media of claim 14, further comprising causing the robot to position the object in the imaging space.

20. The one or more non-transitory computer readable media of claim 14, wherein the object does not touch any other object disposed in the imaging space.

* * * * *